United States Patent [19]

Kratel et al.

[11] Patent Number: 5,556,689
[45] Date of Patent: Sep. 17, 1996

[54] MICROPOROUS THERMAL INSULATION MOLDING

[75] Inventors: Günter Kratel, Durach-Bechen; Günter Stohr, Durach; Martin Gross, Kämpfelbach; Eugen Wilde, Knittlingen, all of Germany

[73] Assignees: Wacker-Chemie GmbH, Munich; Elektro-Gerätebau GmbH, Oberderdingen, both of Germany; a part interest

[21] Appl. No.: 217,923

[22] Filed: Mar. 25, 1994

[30] Foreign Application Priority Data

Mar. 31, 1993 [DE] Germany ............... 43 10 613.7

[51] Int. Cl.$^6$ ............... C04B 33/32; E04B 1/74
[52] U.S. Cl. ............... 428/137; 428/312.8; 428/313.9; 428/315.9; 252/62; 501/39; 501/55; 501/80
[58] Field of Search ............... 428/312.8, 313.9, 428/315.9, 131, 137; 501/80, 39, 55; 252/62

[56] References Cited

U.S. PATENT DOCUMENTS 4,636,416 1/1987 Kratel et al. ............... 428/315.9
4,985,163 1/1991 Kratel et al. .

FOREIGN PATENT DOCUMENTS 0068360 1/1983 European Pat. Off. .
0234686 9/1987 European Pat. Off. .
0248918 12/1987 European Pat. Off. .
0315169 5/1989 European Pat. Off. .
0518513 12/1992 European Pat. Off. .
2137188 10/1984 United Kingdom .

OTHER PUBLICATIONS

Derwent Abstract of EP 248 918.
Derwent Abstract of EP 315 169.

*Primary Examiner*—Marion E. McCamish
*Assistant Examiner*—Blaine R. Copenheaver
*Attorney, Agent, or Firm*—Collard & Roe, P.C.

[57] ABSTRACT

A microporous thermal insulation molding comprising compressed thermal insulation material comprising 30–100% by weight of finely divided metal oxide, 0–50% by weight of opacifier, 0–50% by weight of fiber material and 0–15% by weight of inorganic binder, wherein at least one surface of the molding has channel pores having a cross-sectional area of the pore of 0.01–8 mm$^2$ and having an intrusion depth of 5–100%, based on the thickness of the molding, with 0.004–10 channel pores being present per 1 cm$^2$ of the molding surface.

9 Claims, No Drawings

MICROPOROUS THERMAL INSULATION MOLDING

BACKGROUND OF THE INVENTION

1. Field of the Invention

The present invention relates to a microporous thermal insulation molding comprising compressed thermal insulation material comprising 30–100% by weight of finely divided metal oxide, 0–50% by weight of opacifier, 0–50% by weight of fiber material and 0–15% by weight of inorganic binder.

2. The Prior Art

U.S. Pat. No. 4,985,163 discloses microporous thermal insulation moldings.

The finely divided metal oxides preferably used in such microporous thermal insulation moldings are pyrogenic silicas including electric arc silicas, precipitated silicas or silicon dioxide aerogels and also analogously prepared aluminum oxides. To achieve good thermal insulation properties these finely divided oxides possess very high specific surface areas which preferably lie in the range of 50–700 $m^2/g$ (measured by BET, as described in ASTM Special Technical Publication No. 51, p. 1941 ff.). As a result of these large surface areas, these oxides have a very strongly pronounced ability to adsorb polar substances. As is known, they therefore act as very effective drying agents and in the natural atmosphere readily absorb water. Accordingly, the same behavior is shown by the microporous thermal insulation moldings produced therefrom. In practice, therefore, moisture absorption by the microporous heat insulation moldings during storage and use cannot be prevented. If in practical use these microporous thermal insulation moldings are now exposed to a high temperature within a short period of time, there is explosive formation of steam which destroys the structure of the thermal insulation molding. This effect occurs, for example, in microporous thermal insulation moldings used as thermal insulation in radiation heating units for ceramic hotplates, if these radiation heating units are brought to red heat by means of the customary resistance heating elements at the intervals of preferably from 1 to 5 seconds which are now customary for the newest generation of such units. However, these short heating times are unavoidable because of the changed consumer attitude.

SUMMARY OF THE INVENTION

It is an object of the present invention to raise the gas permeability of microporous thermal insulation moldings, in particular to increase the diffusion of water vapor from the interior to the surface of the molding and thus to avoid local excess pressure, in the interior of the molding, which would destroy the structure of the molding.

The above object is achieved according to the present invention by providing a microporous thermal insulation molding comprising compressed thermal insulation material comprising 30–100% by weight of finely divided metal oxides, 0–50% by weight of opacifier, 0–50% by weight of fiber material and 0–15% by weight of inorganic binder, wherein at least one surface of the molding has channel pores having a cross-sectional area of the pore of 0.01–8 $mm^2$ and having an intrusion depth of 5–100%, based on the thickness of the molding, with 0.004–10 channel pores being present per 1 $cm^2$ of the molding surface.

Thermal insulation moldings according to the invention have the advantage of retaining their structure on shock heating even after extreme water absorption, without the thermal insulation properties of the molding being reduced.

The thermal insulation moldings according to the invention customarily have the following property values:

density 250–350 g/l;
flexural strength>0.15 $N/mm^2$;
compressive strength>1.0 $N/mm^2$;
thermal conductivity<0.025 W/mK; and
electrical resistance>2000 MΩ.

Thermal insulation material used according to the invention has the following composition:

30–100% by weight of finely divided metal oxide;
0–50% by weight of opacifier;
0–50% by weight of fiber material; and
0–15% by weight of inorganic binder.

Preferred compositions comprise:

30–89% by weight of finely divided metal oxide;
10–50% by weight of opacifier;
1–50% by weight of fiber material; and
0–5% by weight of inorganic binder.

Particularly preferred compositions include the following:

50–89% by weight of finely divided metal oxide;
20–40% by weight of opacifier;
5–20% by weight of fiber material; and
0.5–2% by weight of inorganic binder.

Finely divided metal oxides which are preferably used are pyrogenic silicas, including electric arc silicas, low-alkali precipitated silicas, silicon dioxide aerogels, analogously prepared aluminum oxides and mixtures thereof. Preference is given to using pyrogenic silicas, aluminum oxide or mixtures thereof. The finely divided metal oxides have BET surface areas of preferably 50–700 $m^2/g$, in particular 70–400 $m^2/g$.

Examples of opacifiers are ilmenite, titanium dioxide, silicon carbide, iron(II)/iron(III) mixed oxide, chromium dioxide, zirconium oxide, manganese dioxide, iron oxide, silicon dioxide, aluminum oxide and zirconium silicate, and also mixtures thereof. Preference is given to using ilmenite and zirconium silicate. The opacifiers advantageously have an absorption maximum in the infrared range between 1.5 and 10 μm.

Examples of fiber materials are glass wool, rock wool, basalt wool, slag wool and ceramic fibers as are obtained from melts of aluminum oxide, silicon oxide, and mixtures thereof. Preference is given to using fibers obtained from the melts of aluminum oxide and/or silicon oxide. These fibers preferably have the following dimensions:

a diameter of 0.1–12 μm; and
a length of 1–25 mm.

Inorganic binders which can be used are all binders whose use is known in microporous thermal insulation moldings. Examples of such binders are disclosed in U.S. Pat. No. 4,985,163 which is herewith expressly incorporated by reference. Preference is given to using borides of aluminum, of titanium, of zirconium, of calcium, or to using silicides, such as calcium silicide and calcium aluminum silicide, in particular boron carbide. Examples of further components are basic oxides, in particular magnesium oxide, calcium oxide or barium oxide.

The following factors have proven to be important for the gas permeability and thus for the performance of the channel pores: spatial distribution, cross-sectional area and intrusion depth. The number of channel pores per 1 $cm^2$ of molding surface is from 0.004 to 10 channel pores, preferably from 0.15 to 0.6. The cross-sectional area of the channel pores is 0.01 mm$^2$–8 mm$^2$, preferably 0.10–0.8 mm$^2$. The intrusion depth depends on the thickness of the molding and is 5–100%, preferably 40–70%, based on the thickness of the molding, taken from the heated side of the molding.

The production of the compressed thermal insulation moldings of the invention preferably comprises the following process steps:

I. Preconsolidating the thermal insulation mixture based on finely divided metal oxide at pressures from 1 to 5 bar, in particular 2 bar or about 2 bar, and compressing the preconsolidated material into the desired shape at final pressures from 8 to 20 bar, with the thickness of the resulting shaped article being preferably from 10 to 35 mm, in particular from 10 to 15 mm.

II. If desired, heating the compressed body at temperatures from 500° C. to 900° C. (hardening process).

III. Formation of the channel pores
  1. during step I or
  2. after step I or
  3. after step II.

The shaping of the channel pores is here carried out using devices known per se for forming channels, such as, for example, drills, punches or milling cutters; however, preference is given to using embossing stamps.

Examples for the shape of the cross section of the channel pores are circles, triangles, rectangles or squares. If desired, this cross section can also vary over the intrusion depth. The channel pores are preferably circular.

The thermal insulation moldings of the invention are used in all areas in which microporous thermal insulation moldings have hitherto been used, such as, for example, in radiation heating units for heating a plate, in particular a glass ceramic plate, in radiation heating of ovens, in particular baking ovens, in heat radiators or in halogen radiators. Heat radiators possess as the heat source a heating wire or a heating strip, while halogen radiators possess a halogen lamp. Recently, heating by halogen and heating by heating wire or heating strip combined in the same heat radiator has become known.

Other objects and features of the present invention will become apparent from the following detailed description considered in connection with the accompanying Examples, which disclose the embodiments of the present invention. It should be understood, however, that the Examples are designed for the purpose of illustration only and not as a definition of the limits of the invention.

COMPARATIVE EXAMPLE 62.5% by weight of pyrogenic silica;
31.7% by weight of zirconium silicate;
5.0% by weight of aluminum silicate fiber; and
0.8% by weight of boron carbide.

100.0% were compressed to give a molding having a diameter of 198 mm and a thickness of 13 mm and treated for 1 hour at 800° C. in a furnace.

The molding obtained was maintained at 30° C. at 93% relative humidity for 40 hours. The water absorption was 11% by weight, based on the total weight of the insulation. This moisture-containing molding was tested as described below:

a) Direct heating: a fully installed radiation heating unit comprising a microporous thermal insulation molding and a heating strip was, as would be required in later use, covered with a thermal insulation plate and heated at a heating power of 1800W for 30–60 seconds.

b) Indirect heating: the microporous thermal insulation molding was heated by means of a heating element mounted above its surface, using a heating power of 1800W for 30–60 seconds.

Result: in both cases the moldings burst open because the water vapor pressure in the interior of the parts was too high.

EXAMPLE (INVENTION)

A microporous thermal insulation molding was produced in accordance with the comparative example and provided, once before and once after the thermal treatment at 800° C., with 0.35 channel pores per 1 cm$^2$ of molding surface by compressing in pins having a diameter of 0.3 mm$^2$ and a length of 8 mm.

The moldings thus obtained were heated directly and indirectly in the same manner as in the comparative example.

Result: no bursting occurred according to the invention, whereas in the comparative example bursting was observed. The moldings were not damaged according to the invention.

While an embodiment of the present invention has been shown and described, it is to be understood that many changes and modifications may be made thereunto without departing from the spirit and scope of the invention as defined in the appended claims.

What is claimed is:

1. A microporous thermal insulation molding comprising:
   compressed thermal insulation material comprising;
   30–100% by weight of finely divided metal oxide;
   0–50% by weight of opacifier;
   0–50% by weight of fiber material; and
   0–15% by weight of inorganic binder;
   said thermal insulation material has channel pores and at least one surface having channel pores having a cross-sectional area of the pore of 0.01–8 mm$^2$ and having an intrusion depth of 5–100%, based on the thickness of the thermal insulation material, with 0.004–10 channel pores being present per 1 cm$^3$ of the surface of the thermal insulation material, said channel pores increase the diffusion of water vapor from the interior of the thermal insulation material to the surface of the thermal insulation material to avoid localized pressure build up.

2. The microporous thermal insulation molding as claimed in claim 1, wherein the finely divided metal oxides used have BET surface areas of 50–700 m$^2$/g.

3. The microporous thermal insulation molding as claimed in claim 1, wherein the finely divided metal oxides used have BET surface areas of 70–400 m$^2$/g.

4. The microporous thermal insulation molding as claimed in claim 1,
   wherein the finely divided metal oxides used are selected from the group consisting of pyrogenic silicas, electric arc silicas, low-alkali precipitated silicas, silicon dioxide aerogels, analogously prepared aluminum oxides and mixtures thereof.

5. The microporous thermal insulation molding as claimed in claim 1,
   wherein from 0.15 to 0.7 channel pores are present per 1 cm$^2$ of molding surface.

6. The microporous thermal insulation molding as claimed in claim 1,
  wherein the cross-sectional area of the channel pores is from 0.10 to 0.8 mm$^2$.

7. The microporous thermal insulation molding as claimed in claim 1,
  wherein the intrusion depth is 40–70%, based on the thickness of the molding.

8. The microporous thermal insulation molding as claimed in claim 1,
  wherein the molding has a density of 250–350 g/l, a flexural strength greater than 0.15 N/mm$^2$, a compressive strength greater than 1.0 N/mm$^2$, a thermal conductivity less than 0.025 W/mK, and an electrical resistance greater than 2000 MΩ.

9. The microporous thermal insulation molding as claimed in claim 1,
  wherein the compressed thermal insulation material comprises
  30–89% by weight of finely divided metal oxide;
  10–50% by weight of opacifier;
  1–50% by weight of fiber material; and
  0–5% by weight of inorganic binder.

* * * * *

UNITED STATES PATENT AND TRADEMARK OFFICE
CERTIFICATE OF CORRECTION

PATENT NO. : 5,556,689
DATED : SEPTEMBER 17, 1996
INVENTOR(S) : KRATEL ET AL

It is certified that error appears in the above-identified patent and that said Letters Patent are hereby corrected as shown below:

Cover page, column 1, item [73], second assignee's name should be --E.G.O. Elektro-Gerätebau GmbH--.

Signed and Sealed this

Twenty-first Day of January, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,556,689
DATED : September 17, 1996
INVENTOR(S) : Günter Kratel et al.

It is certified that error appears in the above-identified patent and that said Letters Patent is hereby corrected as shown below:

Claim 1,
Line 12, "$cm^3$" should be -- $cm^2$ --.

Signed and Sealed this

Eighteenth Day of September, 2001

Attest:

NICHOLAS P. GODICI
Attesting Officer  Acting Director of the United States Patent and Trademark Office